United States Patent
Cobey

[15] 3,662,962
[45] May 16, 1972

[54] MACHINE FOR TREATING REFUSE

[72] Inventor: Herbert T. Cobey, Galion, Ohio
[73] Assignee: Imco, Inc., Crestline, Ohio
[22] Filed: Mar. 13, 1969
[21] Appl. No.: 806,864

[52] U.S. Cl. ............................................ 241/101 M, 56/192
[51] Int. Cl. .................................... B02c 19/12, A01d 57/30
[58] Field of Search ............... 241/101, 189; 56/16, 17, 25.4, 56/192; 172/119, 122, 123

[56] References Cited

UNITED STATES PATENTS

| | | |
|---|---|---|
| 1,851,875 | 3/1932 | Siegel ............................... 172/122 X |
| 2,648,943 | 8/1953 | Shafer et al. .............................. 56/17 |
| 3,126,689 | 3/1964 | Walker et al. ........................... 56/25.4 |
| 3,092,946 | 6/1963 | Mathews .............................. 56/192 X |
| 3,106,052 | 10/1963 | Ingram ................................... 56/1 C |

FOREIGN PATENTS OR APPLICATIONS 1,166,593   3/1964   Germany ............................... 241/189

*Primary Examiner*—Andrew R. Juhasz
*Assistant Examiner*—Gary L. Smith

[57] ABSTRACT

A machine for treating refuse disposed in windrows characterized by a longitudinally extending tunnel and means for effectively confining and treating the refuse within said tunnel while a machine progresses thereover. The machine is further characterized by a main frame and an auxiliary frame supported by the main frame and defining an open ended tunnel. A rotary member is extended transversely of the tunnel for impacting refuse against the top wall of the tunnel. The machine is further characterized by a forwardly extending guide means mounted on said main frame adjacent the top of the tunnel with said guide means being adjustable with respect to its angle of inclination so as to most effectively treat windows of refuse of various heights.

9 Claims, 12 Drawing Figures

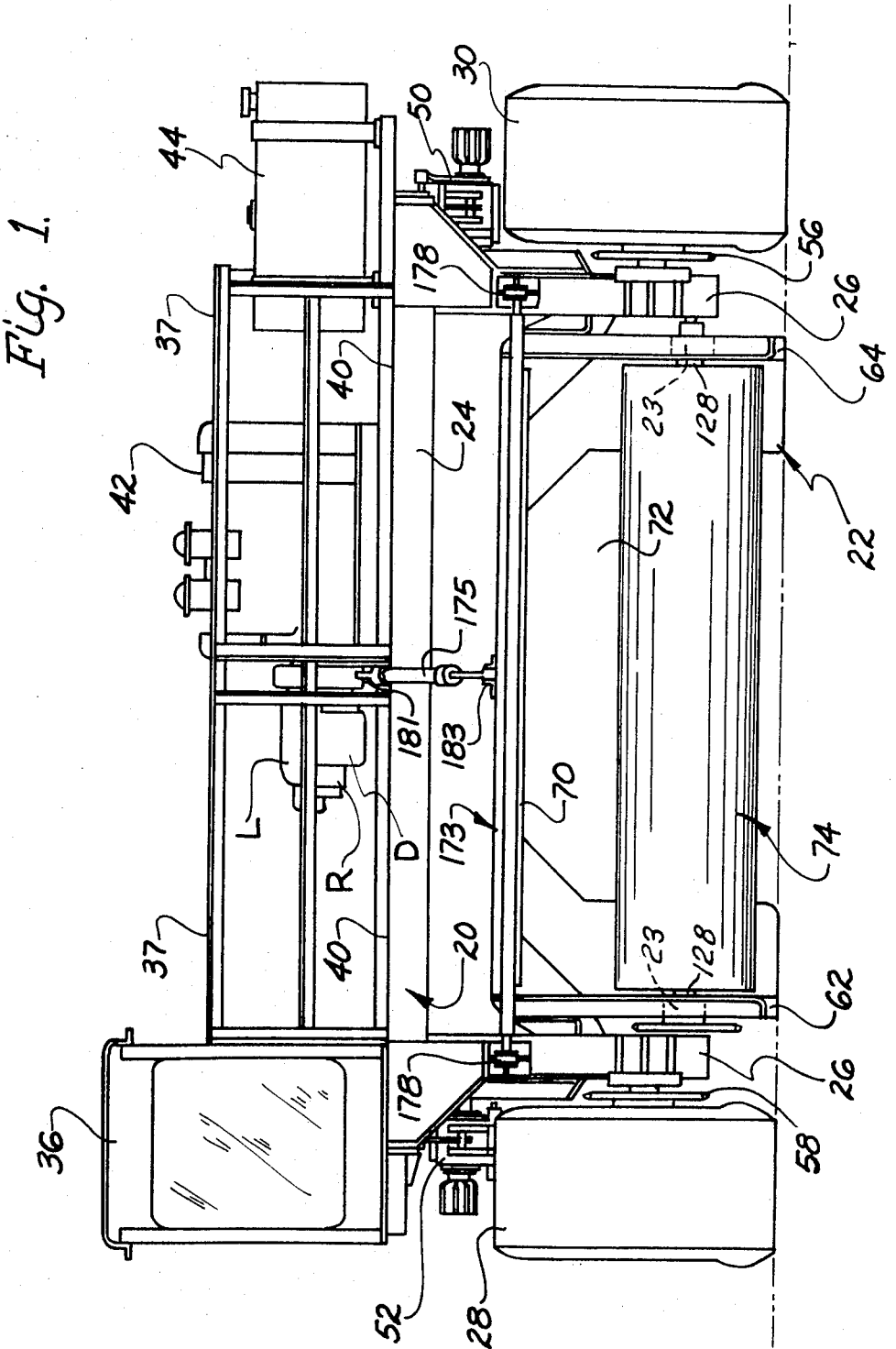

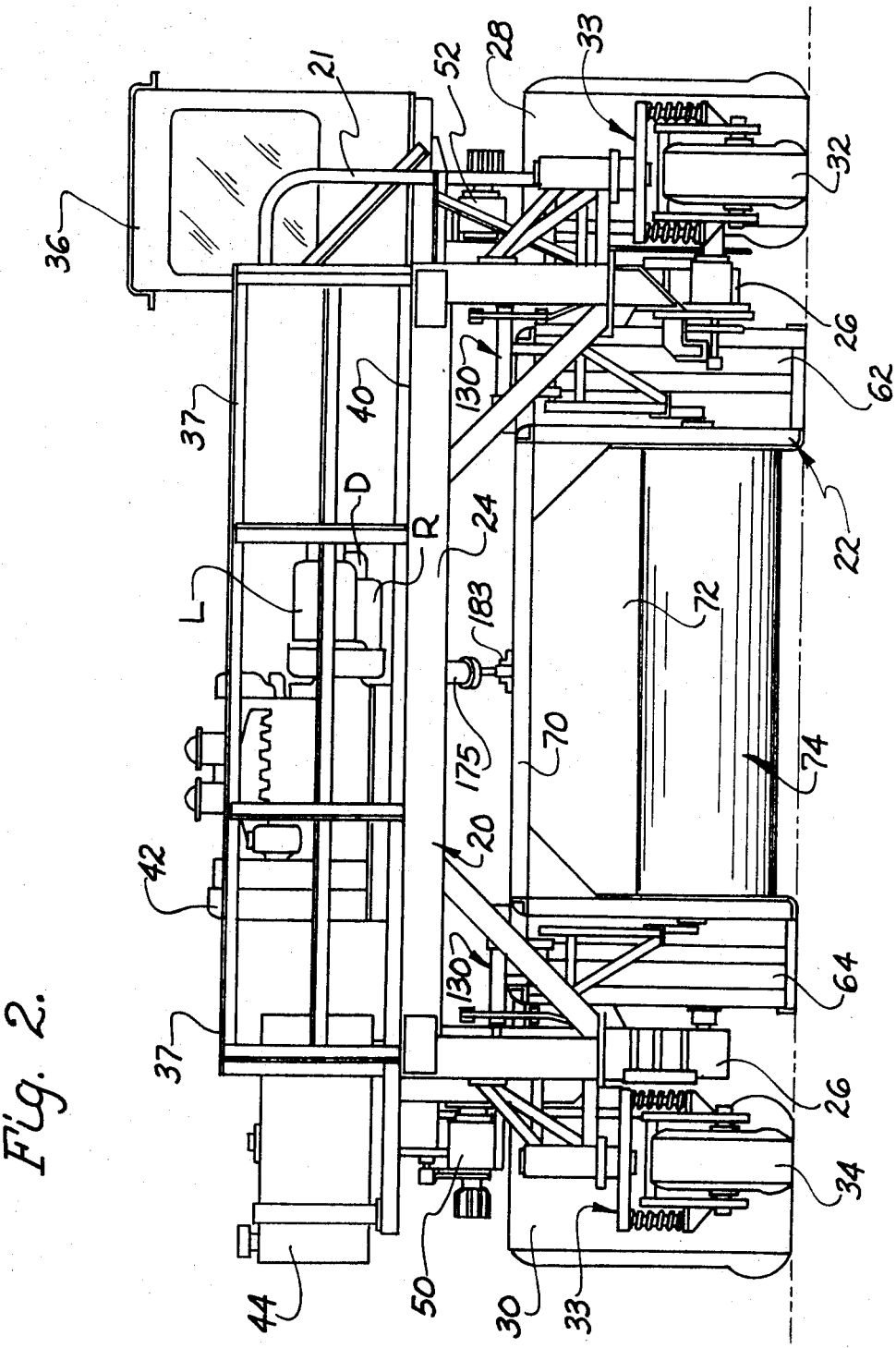

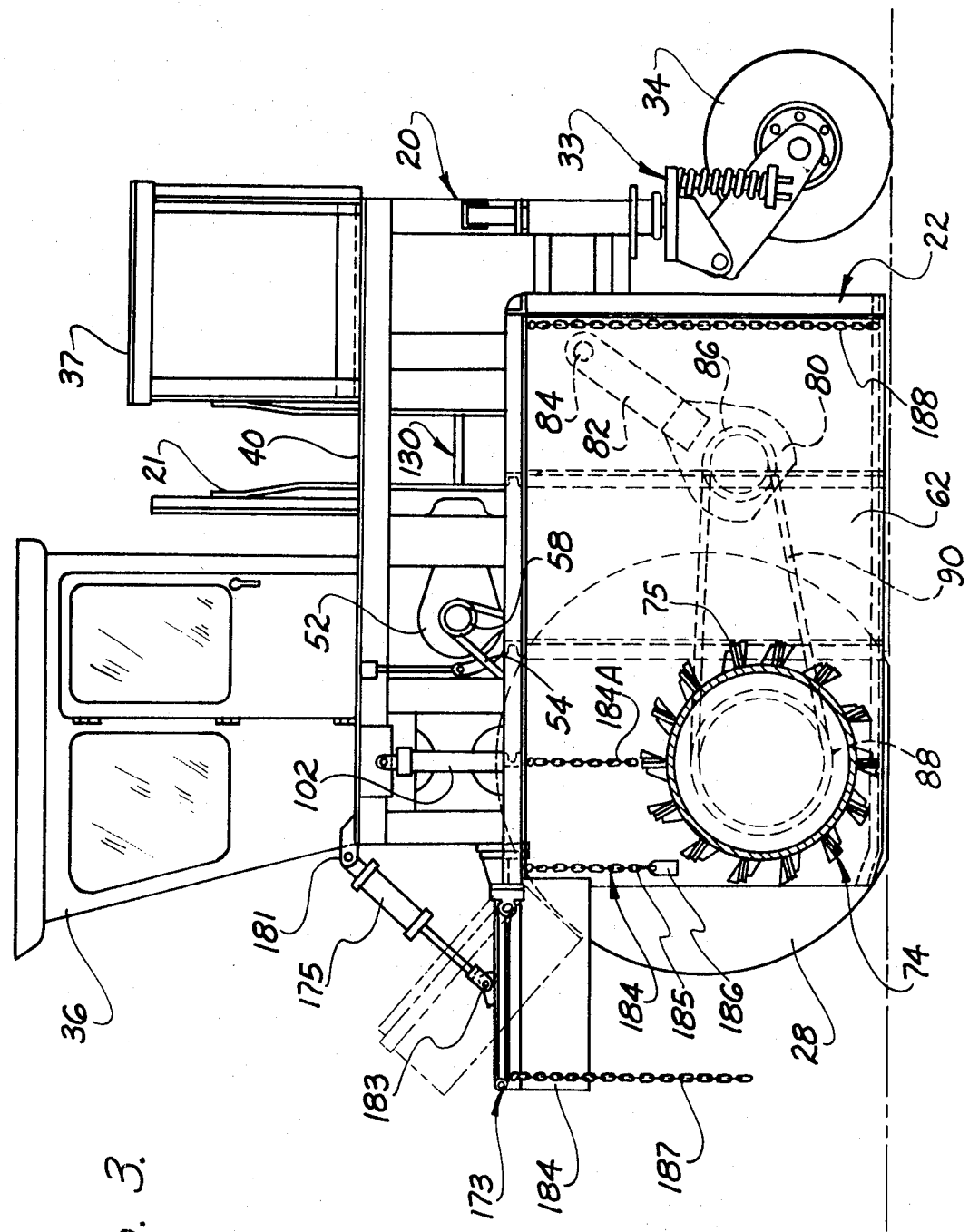

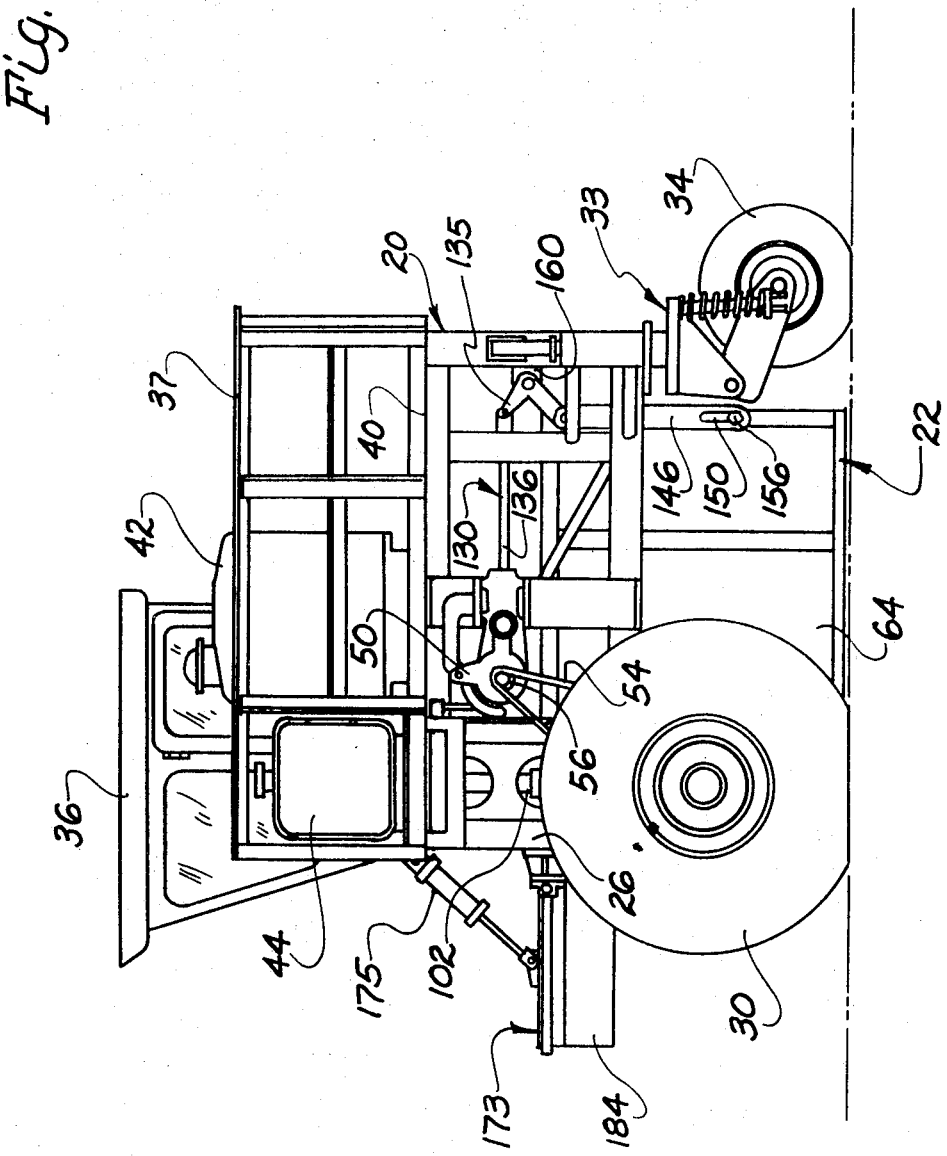

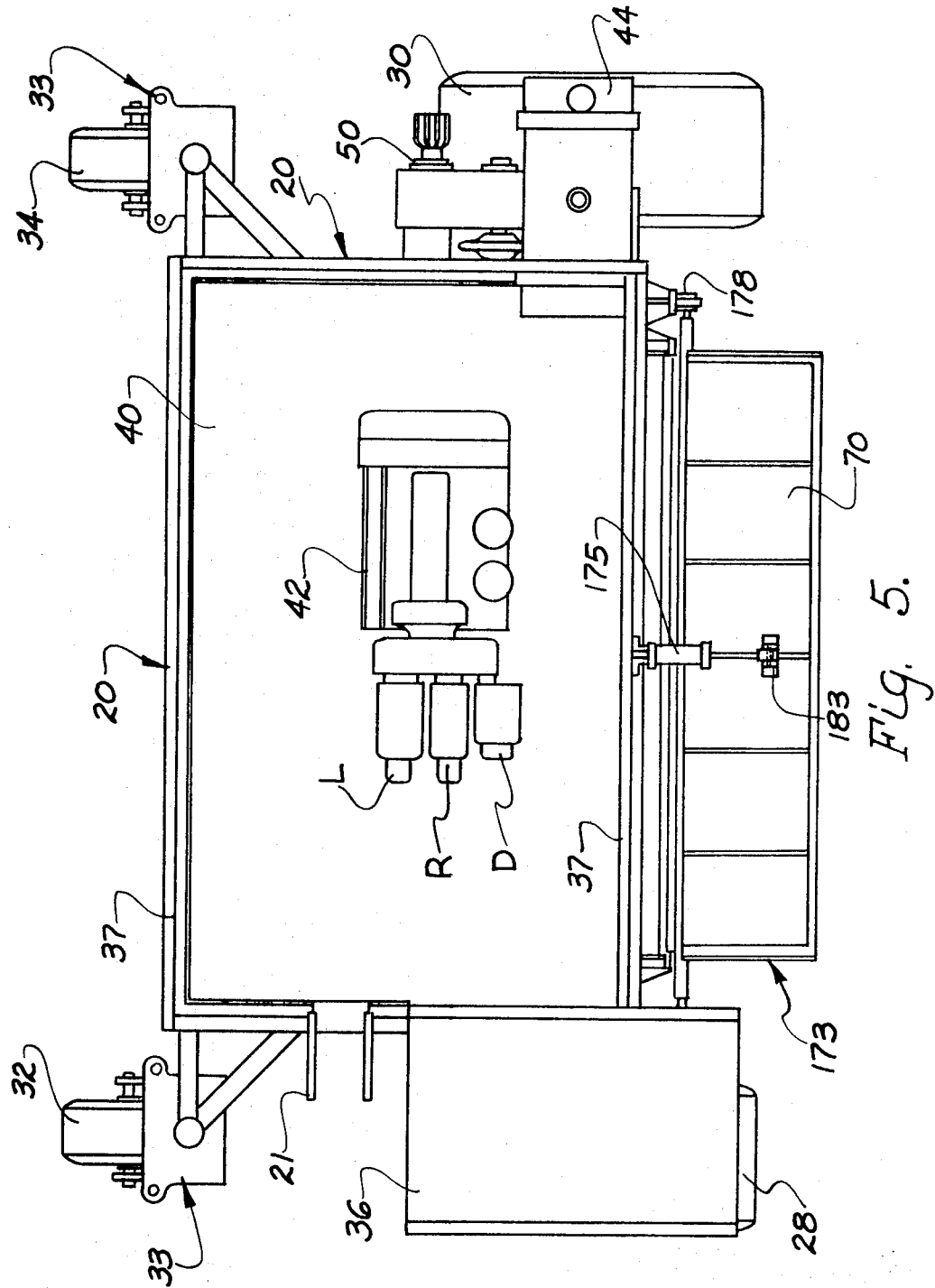

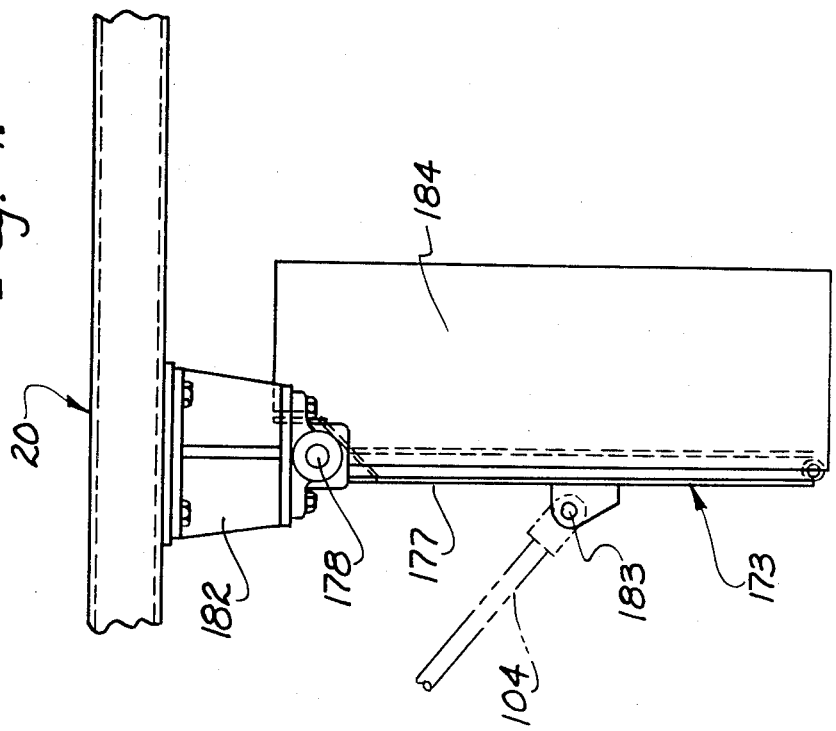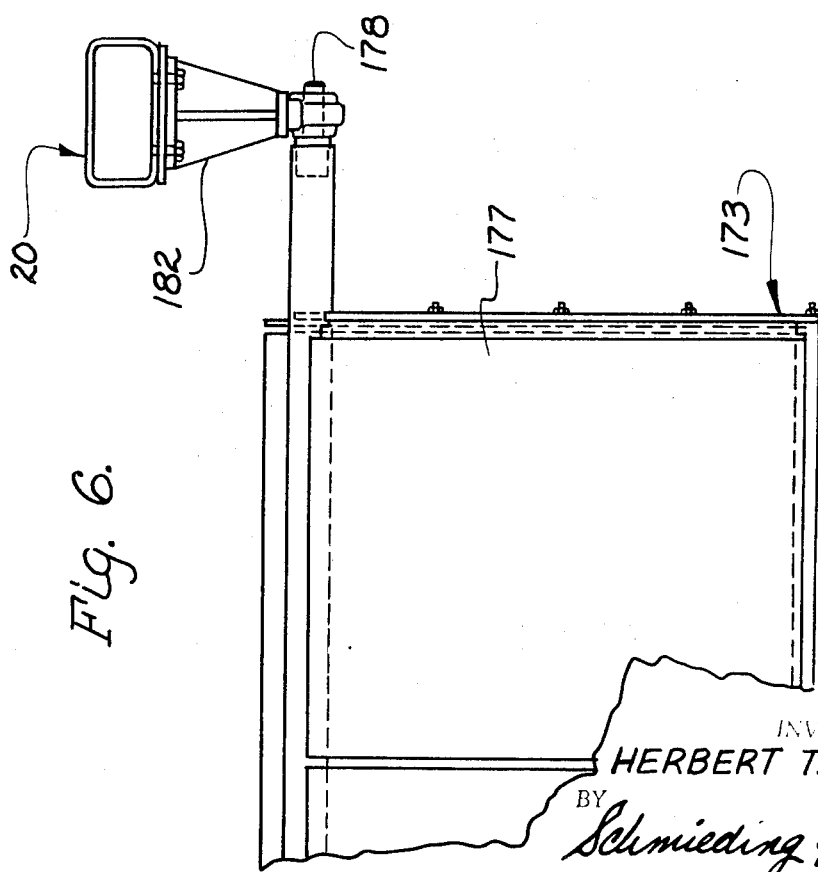
INVENTOR.
HERBERT T. COBEY
BY
Schmieding & Fultz
ATTORNEYS

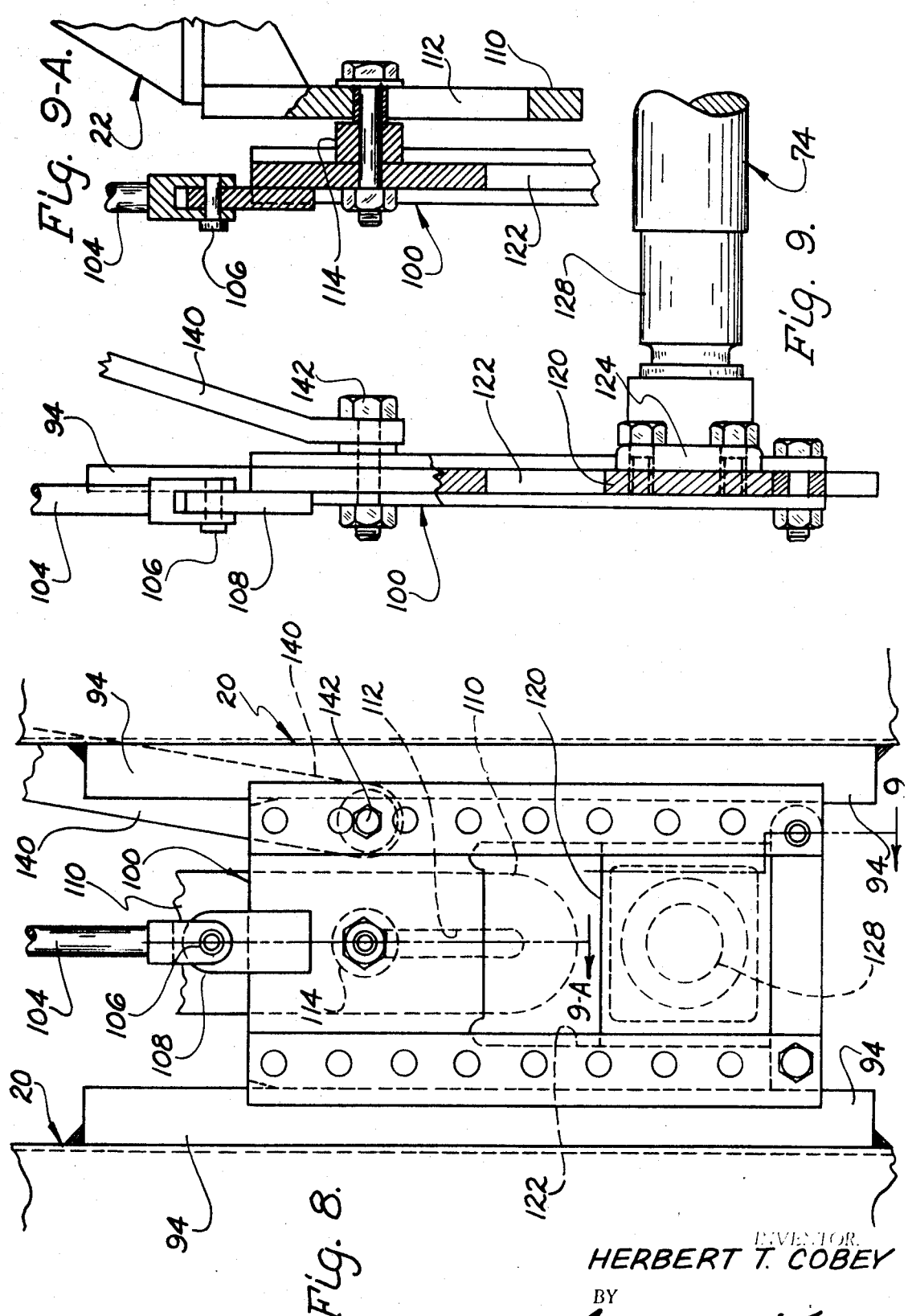

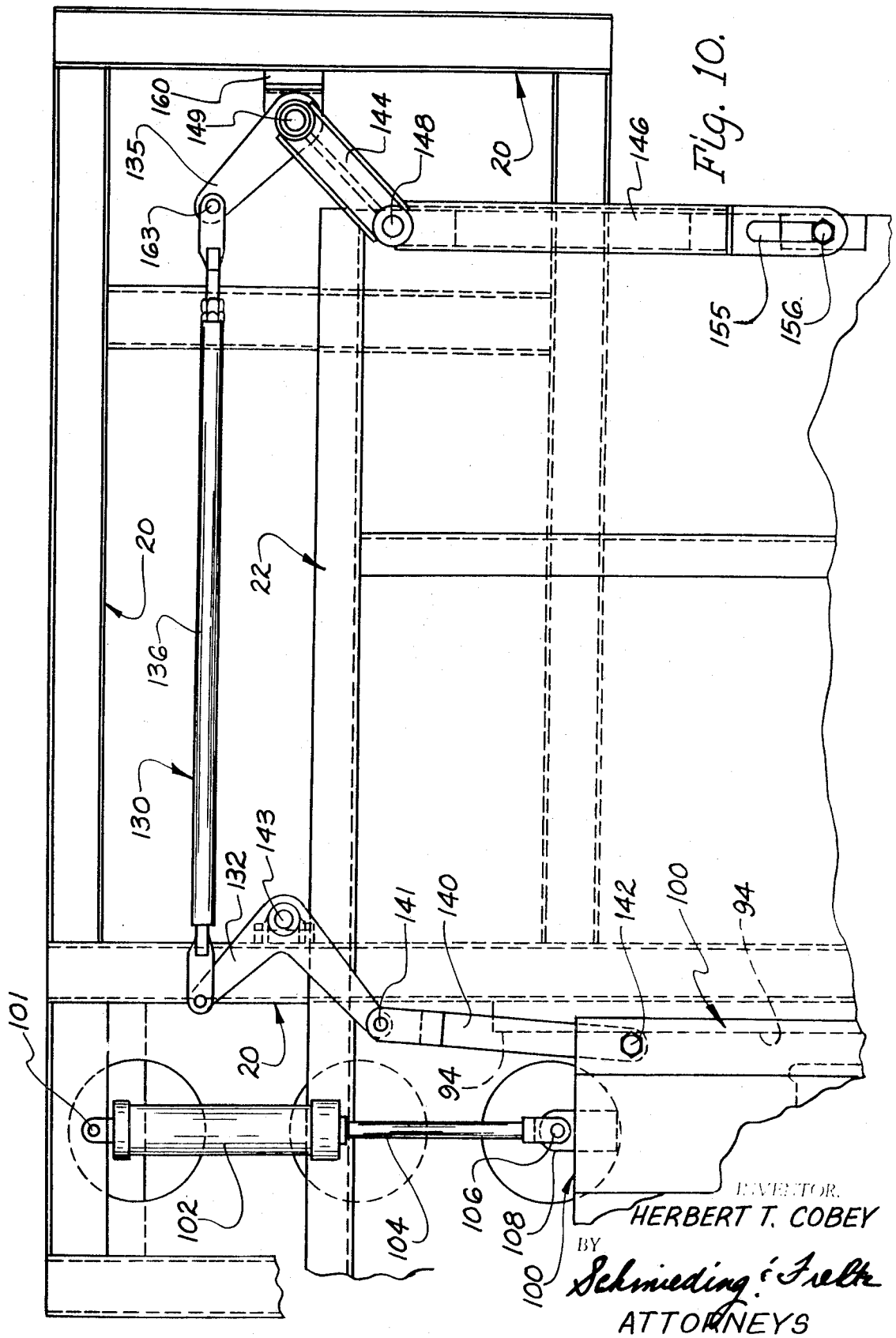

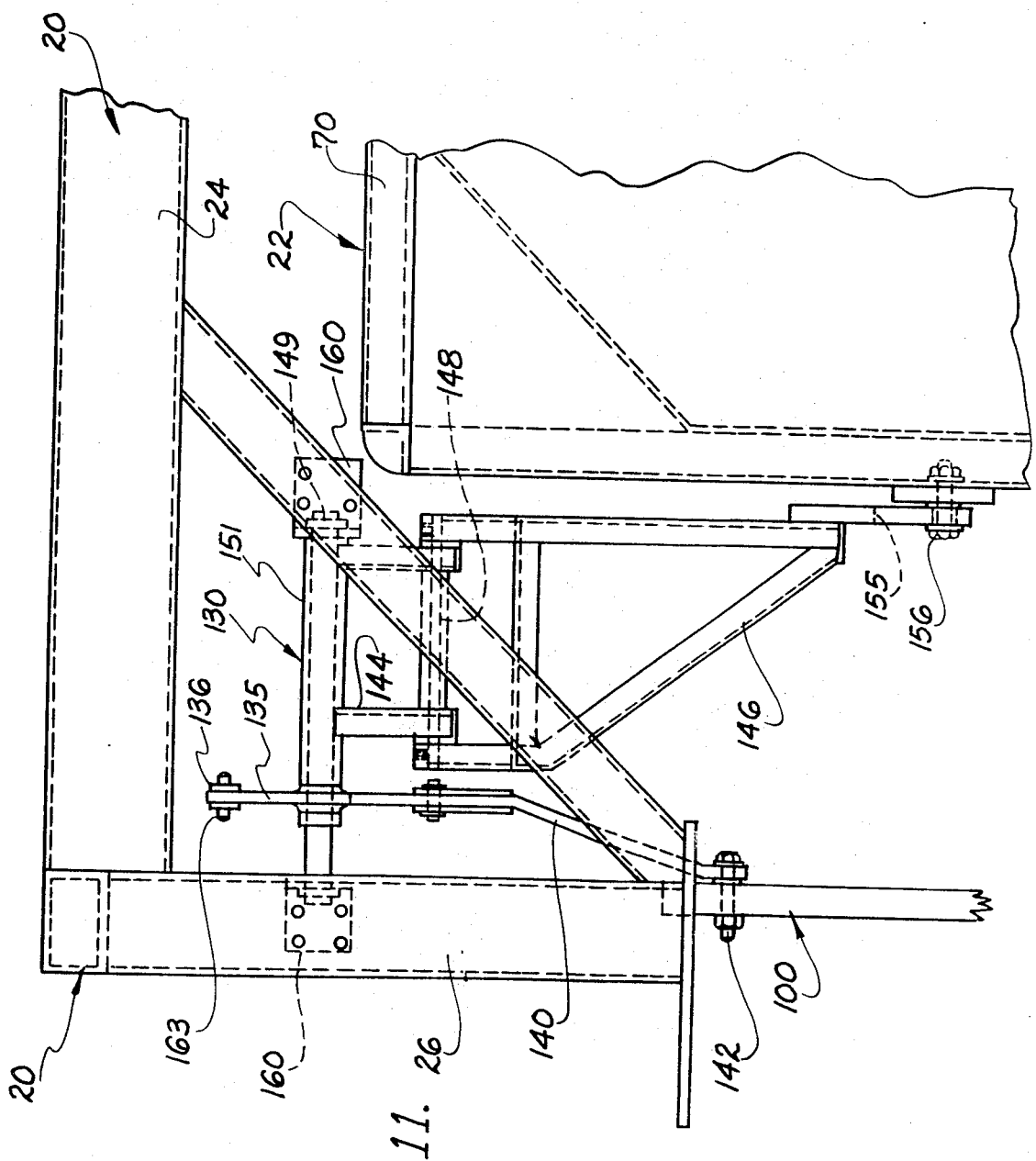

MACHINE FOR TREATING REFUSE

This invention relates generally to machine for treating refuse and more particularly to an apparatus for turning and shredding waste materials disposed in windrows for the purpose of efficiently composting such materials.

In general, the machine of the present invention includes a frame means forming an open ended tunnel adapted to straddle a windrow of refuse material. The frame means is supported by laterally spaced wheels driven by power means for propelling the machine along a windrow. The machine further includes an operator's cab provided with a steering mechanism for controlling the path of movement of the machine.

The frame means of the machine is of composite construction and includes an auxiliary or tunnel forming frame suspended from a main frame between said laterally spaced wheels. This auxiliary frame includes laterally spaced side walls and a top wall defining the above mentioned tunnel.

The machine further includes a rotary refuse engaging member extending transversely between the tunnel side walls which member serves to continuously engage the material as the machine moves along a windrow so as to turn and shred it and thereafter redeposit it in its windrow formation.

In accordance with one aspect of the present invention the forward end of the tunnel is provided with a forwardly extending guide means pivotally mounted to said main frame adjacent the top of the tunnel entrance. In addition, a guide control means is provided for varying the angle of inclination of said guide means between an upwardly inclined position and a downwardly declined position. In said upwardly inclined position the guide means function as a scoop to direct refuse from windrows higher than said tunnel into said tunnel. In said downwardly declined position said guide means functions as a baffle or shield that prevents objects of refuse from being centrifugally impelled forwardly from the tunnel by the rotary action of the rotating refuse engaging member.

As another aspect of the present invention the above described adjustable guide means not only cooperates with a rotary refuse engaging member to provide a shield therefor but in addition is adjustable to various angles of declination for retaining centrifugally impelled refuse confined in a turning and shredding zone located immediately forwardly of said rotary refuse engaging member.

It is therefor an object of the present invention to provide a machine for treating refuse disposed in windrows that is provided with guide means for efficiently directing said refuse into the entrance of a tunnel traveling along said windrows.

It is another object of the present invention to provide a machine of the type described that is provided with an adjustable guide means that functions as a shield for retaining centrifugally impelled objects of refuse in a turning and shredding zone whereby said refuse is more efficiently particalized and composted.

Further objects and advantages of the present invention will be apparent from the following description, reference being had to the accompanying drawings wherein a preferred form of embodiment of the invention is clearly shown.

IN THE DRAWINGS

FIG. 1 is a front elevational view of a machine constructed in accordance with the present invention;

FIG. 2 is a rear elevational view of the machine of FIG. 1;

FIG. 3 is a left side sectional view of the machine of the preceding figures, the section being taken along a vertical plane extending longitudinally through the auxiliary frame of the apparatus;

FIG. 4 is a left side elevational view of the machine of FIG. 1;

FIG. 5 is a top elevational view of the machine of FIG. 1;

FIG. 6 is a partial top elevational view of a guide means comprising a portion of the machine of the present invention;

FIG. 7 is a left side sectional view of the guide means of FIG. 6;

FIG. 8 is a partial side elevation view of a linkage apparatus for vertically adjusting the auxiliary frame and rotary refuse engaging member utilized in the machine of the preceding figures;

FIG. 9 is an end sectional view of the slide and track means of FIG. 8;

FIG. 9-A is a side elevational view of the auxiliary frame of the machine of the preceding figures;

FIG. 10 is a partial side elevational view of a linkage apparatus for vertically adjusting the auxiliary frame of the machine of the preceding figures; and FIG. 11 is a rear elevational view of FIG. 10.

Referring in detail to the drawings, a machine constructed in accordance with the present invention is illustrated in the elevational views of FIGS. 1–5 and comprises a main frame indicated generally at 20 that includes transverse frame members 24 the ends of which are connected to vertical frame member 26. Main frame 20 is supported by main driving wheels 28 and 30 and by auxiliary rear caster assemblies indicated generally at 33, said assemblies including right and left caster wheels 32 and 34.

With continued reference to FIGS. 1–5, main frame 20 supports an operator's cab 36 adjacent a floor area 40 surrounded by a railing 37. A ladder 21 provides access to said floor area and cab.

Floor 40 supports an engine 42 and a fuel tank 44. As is best seen in FIG. 5 motor 42 drives three hydrostatic pumps L, R, and D. Pump L serves to drive left main wheel 30 via a hydrostatic motor and speed reduction unit 50, FIG. 4, and pump R functions to drive right main wheel 28 via a right hydrostatic motor and speed reduction unit 52.

It should be mentioned that the driven shafts of hydrostatic motors 50 and 52 are connected to the main driving wheels 30 and 28 by chains 54 and sprockets 56 and 58. Details of the hydraulic circuit for the above mentioned hydrostatic pumps and motors is described in detail in co-pending application Ser. No. 806,863 filed Mar. 13, 1969

With continued reference to FIGS. 1–5, the machine of the present invention further includes an auxiliary frame indicated generally at 22 that comprises side walls 62 and 64 and a top wall 70 that form an open ended tunnel 72 as is best seen in FIGS. 1, 2, 6, and 7.

A refuse engaging member indicated generally at 74 is mounted on the main frame and extends transversely across tunnel 72 so as to engage windrows when the machine is driven along the windrows with the side walls 62 and 64 of auxiliary frame 22 disposed on either side thereof. As is best seen in FIG. 3 rotary member 74 is driven by a hydrostatic motor, not illustrated, which receives pressurized fluid from a hydrostatic pump D, FIG. 5, driven by engine 42. The hydrostatic motor is carried by an arm 82 pivotally mounted to main frame 20 at a pivot 84 and motor is connected to rotary member 74 via sprockets 86 and 88 and a chain 90 as seen in FIG. 3.

It should be mentioned that rotary refuse engaging member 74 is preferably vertically adjustably mounted relative to said main frame means by a track and slide assembly illustrated and described in detail in my co-pending application Ser. No. 806,863 filed Mar. 13, 1969.

It should also be mentioned that rotary refuse engaging member 74 is provided with a variable speed hydraulic circuit and associated control means whereby the operator can vary the speed of rotation of said rotary member 74 for most effectively treating various types of refuse. Such hydraulic circuit and associated control means are described in detail in my co-pending application Ser. No. 806,863 filed Mar. 13, 1969.

Referring particularly to FIGS. 1, 6, and 7, the machine includes a forwardly extending guide means indicated generally at 173 which includes a frame 177 pivotally mounted to main frame 20 at pivot pins 178.

Cylinder 175 includes an upper pivotal connection 181 with a bracket on main frame 20 and a lower pivotal connection 183 with the central portion of frame 177 of guide means 173.

As is best seen in FIGS. 3, 4, and 7 guide means 173 may be provided with downwardly extending flanges 184 which augment the shielding function of said guide means.

With reference to FIG. 3, the guide means 173 is preferably provided with a safety screen 187, formed by flexible members such as chains or the like that can yield rearwardly when engaging a windrow, but which function to prevent the forward escape of centrifugally impelled objects of high density such as tin cans or the like.

Also, a similar rear safety screen 188 is provided to prevent the rearward discharge of relatively heavy objects of refuse.

In operation, when the machine of the present invention is moved along a relatively high windrow of refuse, with such windrow being higher than the tunnel formed by auxiliary frame means 22, then guide actuating cylinder 175 is retracted so as to be inclined upwardly from the horizontal and thereby function as a moving scoop to guide refuse into the tunnel and into engagement with rotary member 74.

It should further be mentioned that guide means 173 can also selectively be declined downwardly, relative to the horizontal such that the horizontal frame portion 177 and downwardly extending side flanges 184 cooperate to form a shield for confining tangentially displaced refuse in a shredding and turning zone immediately forwardly of said rotary member best seen in FIG. 3. This latter function is particularly important after the initially relatively high windrows have been once worked over through said tunnel with their height having thereby been reduced by the moving scoop action of guide or shield 173 in its inclined position.

As is best seen in FIGS. 4, 8 and 9, each side of main frame 20 includes a track means formed by spaced track members 94 on which are mounted respective slide assemblies indicated generally at 100. Each slide assembly, FIGS. 8 and 9, is vertically movable by means of a power cylinder 102 that includes a ram 104 pivotally connected to a respective slide 100 at a pivot 106 and bracket 108.

As seen in FIGS. 8, 9 and 9-A, auxiliary frame 22 includes front tunnel mounting brackets 110 provided with vertically disposed slots 112 and a mounting boss 114 on slide 100 is extended through each vertical slot 112. It will now be understood that when hydraulic cylinder 102, FIG. 4, is pressurized to lift ram 104 then slide assemblies 100 are moved vertically whereby the mounting bosses 114 in slots 112 in the front mounting brackets 110 function to lift the front end of the tunnel. At the same time, it will be understood that slots 112 permit the front end of the tunnel to self-adjust vertically when uneven terrain is encountered.

With continued reference to FIGS. 4, 8 and 9, the slide assemblies 100 each carries a lower slide element 120 adapted to move vertically in a small track 122 formed by the lower portion of slide assembly 100. As seen in FIGS. 8 and 9, the small slides 120 carry right and left bearings 124 which rotatably mount right and left ends of the shaft 128.

It will now be understood that the small slides 120 which carry shaft 128 for rotary members 74 are free to move vertically in their small tracks 122 thereby permitting limited vertical movement of rotary member 74, relative to slide assemblies 100, when such slide assemblies are in their various positions and uneven terrain is encountered.

Referring particularly to FIGS. 4, 10 and 11, a linkage for raising the rear end of auxiliary frame means 22 is indicated generally at 130 and comprises front bell crank levers 132, rear levers 135, the upper ends of said levers being connected by longitudinal rods 136.

As is best seen in FIGS. 10 and 11, the lower arms 137 of front bell crank levers 132 are driven by links 140.

The rear linkage assemblies of FIG. 11 include lower arms 144 which support triangular rear mounting brackets 146 at the pivot rods 148, the upper ends of arms 144 being mounted on a sleeve 151 rotatably mounted on shafts 149.

With continued reference to FIGS. 10 and 11, rear tunnel mounting brackets 146 are provided with slots 155 and bolts 156 pass freely through said slots. It should be mentioned that bolts 156 are mounted on the side walls of auxiliary frame means 22 and thereby permit the rear end of the auxiliary frame to float, within the limits defined by vertical slots 155.

In operation and with continued reference to FIGS. 8, 10 and 11, when the operator desires to raise the auxiliary frame 22, as well as rotary member 74, he actuates a valve at the control station in cab 36 so as to pressurize the lower side of hydraulic cylinder 102, FIG. 10, thereby raising rod 104 and slide assemblies 100 mounted thereon. This extends link 140 upwardly, FIG. 10, thereby pivoting levers 135 and 132 simultaneously due to their upper ends being connected by rod 136. When rear lever 135 is pivoted, clockwise, then arm 144 raises link 146, beyond the limits of lost motion slot 155, thereby raising the rear end of auxiliary frame 22 simultaneously with the front end thereof.

It should further be mentioned that when previously mentioned ram 104 is raised, as viewed in FIGS. 8, 9 and 9-A, then the collar 114, carried by slide assembly 100, moves to the upper termination of a slot 112 in a member 110 rigidly carried by auxiliary frame 22. Upon further upper movement of cylinder ram 104 auxiliary frame 22 is lifted upwardly along with the slide assembly 100.

It will now be understood from FIGS. 8–11 that the operator can lift the entire auxiliary frame 22 and rotary member 74 to any desired position and still maintain independent floating action for each of the auxiliary frame and rotary member. Furthermore, the complete mechanisms can be raised to their uppermost position for purposes of maneuvering and transporting the machine.

I claim:

1. A machine for treating refuse comprising, in combination, a main frame including laterally spaced wheels; an auxiliary frame including laterally spaced side walls and a top wall defining a longitudinally extending tunnel; means supporting frame on said main frame; a rotary member mounted on said main frame on the forward portion thereof for engaging refuse disposed in windrows; power means for said wheels and rotary member; means forming an angularly adjustable guide mounted on said main frame forwardly of said tunnel, the angle of inclination of said guide being variable with respect to the horizontal ; and power means for varying the angle of inclination of said adjustable guide.

2. A machine for treating refuse comprising, in combination, a main frame including laterally spaced wheels and laterally spaced vertically extending track means; vertically movable first slide means mounted on said track means; an auxiliary frame defining a longitudinally extending tunnel including second slide means mounted on said first slide means; linkage means connecting said auxiliary frame to said main frame means; control means operatively connected to said linkage means for vertically adjusting said auxiliary frame relative to said main frame; a rotary member operably attached to said main frame on the forward portion thereof for engaging refuse disposed in windrows; power means for said wheels and rotary member; means forming an angularly adjustable guide mounted on said main frame forwardly of said tunnel , the angle of inclination of said guide being variable with respect to the horizontal ; and power means for varying the angle of inclination of said adjustable guide.

3. A machine for treating refuse comprising, in combination, a main frame including laterally spaced wheels and laterally spaced vertically extending track means; vertically movable first slide means mounted on said track means; an auxiliary frame defining a longitudinally extending tunnel including second slide means mounted on said first slide means; linkage means connecting said auxiliary frame means to said main frame means; control means operatively connected to said linkage means for vertically adjusting said auxiliary frame relative to said main frame; a rotary member mounted on said first slide means on the forward portion thereof for vertical movement therewith; power means for said wheels; power means for driving said rotary member; means forming an angularly adjustable guide mounted on said main frame forwardly of said tunnel , the angle of inclination of said guide being variable with respect to the horizontal ; and power means for varying the angle of inclination of said adjustable guide.

4. A machine for treating refuse comprising, in combination, a main frame including laterally spaced wheels; an auxiliary frame including laterally spaced side walls and a top wall defining a longitudinally extending tunnel; a front lever pivotally mounted on said main frame and including a first lever arm pivotally connected to said auxiliary frame and a second lever arm; a rear lever pivotally mounted on said main frame and including a first lever arm pivotally connected to said auxiliary frame and a second lever arm; a link connecting said second lever arms; means for operating said levers; a rotary member operably attached to said main frame means on the forward portion thereof for engaging refuse disposed in windrows; power means for said wheels and rotary member; means forming an angularly adjustable guide mounted on said main frame forwardly of said tunnel , the angle of inclination of said guide being variable with respect to the horizontal ; and power means for varying the angle of inclination of said adjustable guide.

5. A machine for treating refuse comprising, in combination, a main frame including laterally spaced wheels and laterally spaced vertically extending track means; vertically movable first slide means mounted on said track means; an auxiliary frame defining a longitudinally extending tunnel including second slide means mounted on said track means; a front lever pivotally mounted on said main frame and including a first lever arm pivotally connected to said first slide means and a second lever arm; a rear lever pivotally mounted on said main frame and including a first lever arm pivotally connected to said auxiliary frame and a second lever arm; a link connecting said second lever arms of said front and rear levers; power means for vertically moving said slide means on said main frame whereby said levers raise and lower said auxiliary frame; a rotary member operably connected to said main frame on the forward portion thereof for engaging refuse disposed in windrows; power means for said wheels and rotary member; means forming an angularly adjustable guide mounted on said main frame forwardly of said tunnel , the angle of inclination of said guide being variable with respect to the horizontal ; and power means for varying the angle of inclination of said adjustable guide.

6. A machine for treating refuse comprising, in combination, a main frame including laterally spaced wheels and laterally spaced vertically extending track means; vertically movable first slide means mounted on said track means; an auxiliary frame defining a longitudinally extending tunnel including second slide means mounted on said first slide means; mounted on said track means; linkage means connecting said auxiliary frame to said main frame; control means operatively connected to said linkage means for vertically adjusting said auxiliary frame relative to said main frame; a rotary member mounted on said first slide means; power means for said wheels and rotary member; means forming an angularly adjustable guide mounted on said main frame forwardly of said tunnel , the angle of inclination of said guide being variable with respect to the horizontal ; and power means for varying the angle of inclination of said adjustable guide.

7. A machine for treating refuse comprising, in combination, a main frame including laterally spaced wheels and laterally spaced vertically extending track means; vertically movable first slide means mounted on said track means; an auxiliary frame including second slide means mounted on said first slide means; a front lever pivotally mounted on said main frame means and including a first lever arm pivotally connected to said first slide means and a second lever arm; a rear lever pivotally mounted on said main frame and including a first lever arm pivotally connected to said auxiliary frame and a second lever arm; a link connecting said second lever arms of said front and rear levers; power means for vertically moving said first slide means on said main frame whereby said levers raise and lower said auxiliary frame; a rotary member mounted on said first slide means; power means for said wheels and rotary member; means forming an angularly adjustable guide mounted on said main frame forwardly of said tunnel , the angle of inclination of said guide being variable with respect to the horizontal ; and power means for varying the angle of inclination of said adjustable guide.

8. A machine for treating refuse comprising, in combination, a main frame including laterally spaced wheels; an auxiliary frame including laterally spaced side walls and a top wall defining a longitudinally extending tunnel; means supporting said auxiliary frame on said main frame; a rotary member operably attached to said main frame on the forward portion thereof for engaging refuse disposed in windrows; power means for said wheels and rotary member; means forming an angularly adjustable guide mounted on said main frame forwardly of said tunnel , the angle of inclination of said guide being variable with respect to the horizontal ; power means for varying the angle of inclination of said adjustable guide.

9. A machine for treating refuse comprising, in combination, a main frame including laterally spaced wheels; an auxiliary frame including laterally spaced side walls and a top wall defining a longitudinally extending tunnel; means supporting said auxiliary frame on said main frame; a rotary member operably attached to said main frame on the forward portion thereof for engaging refuse disposed in windrows; power means for said wheels and rotary member; means forming an angularly adjustable guide mounted on said main frame forwardly of said tunnel , the angle of inclination of said guide being variable with respect to the horizontal ; power means for varying the angle of inclination of said adjustable guide.

* * * * *